(No Model.) 3 Sheets—Sheet 1.
J. WESTGARTH.
COW MILKER.
No. 492,449. Patented Feb. 28, 1893.
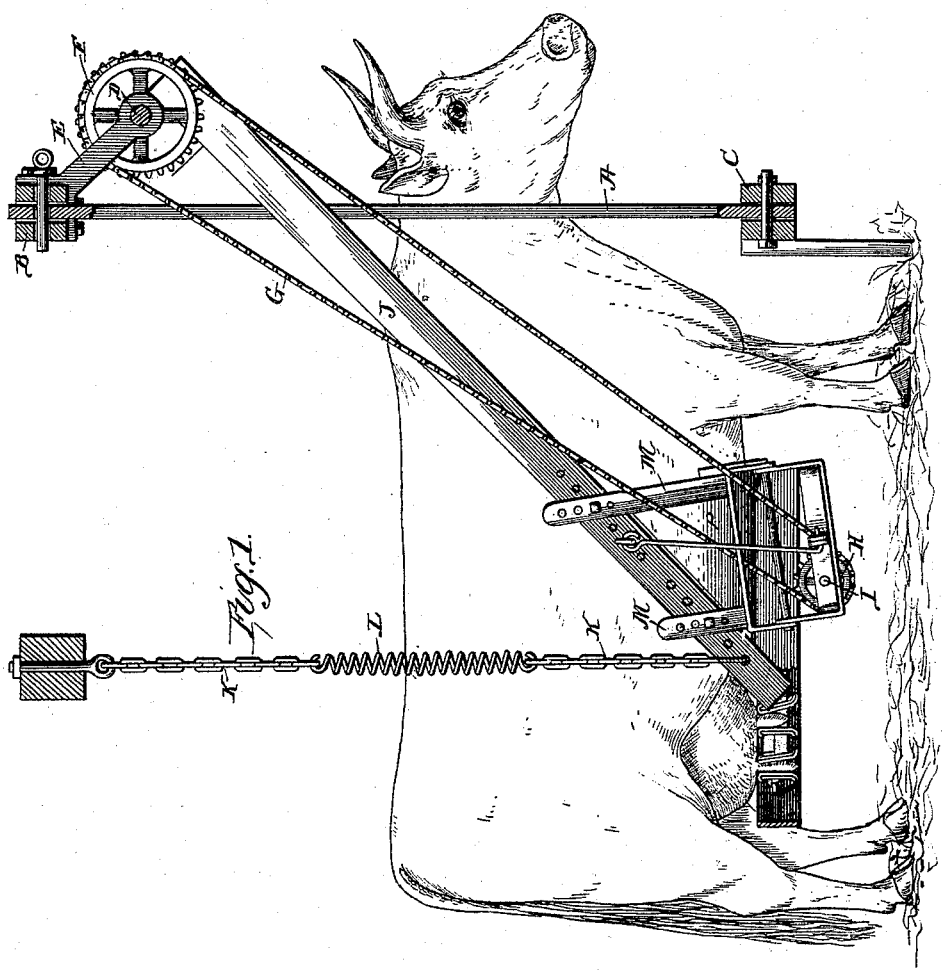

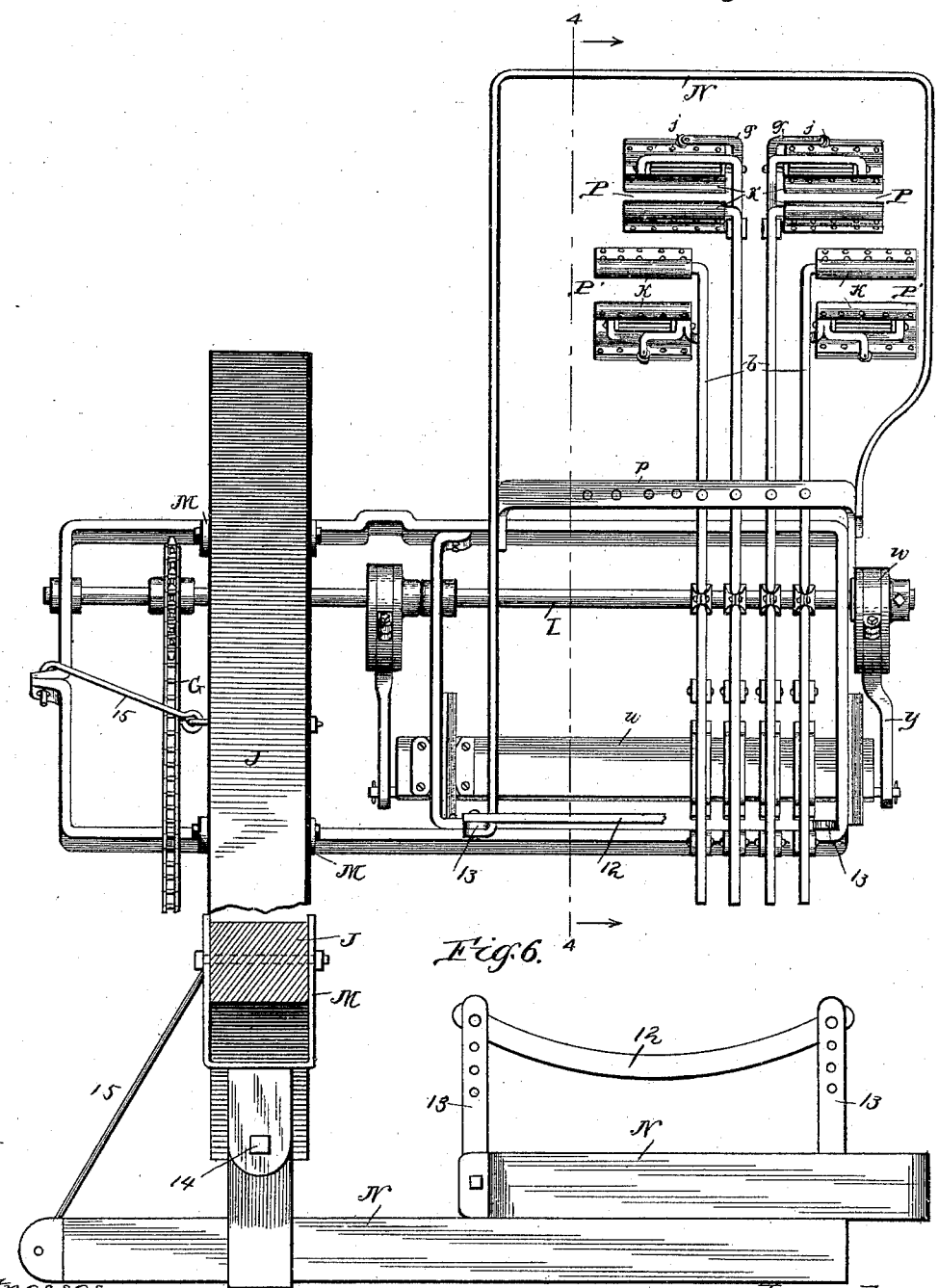

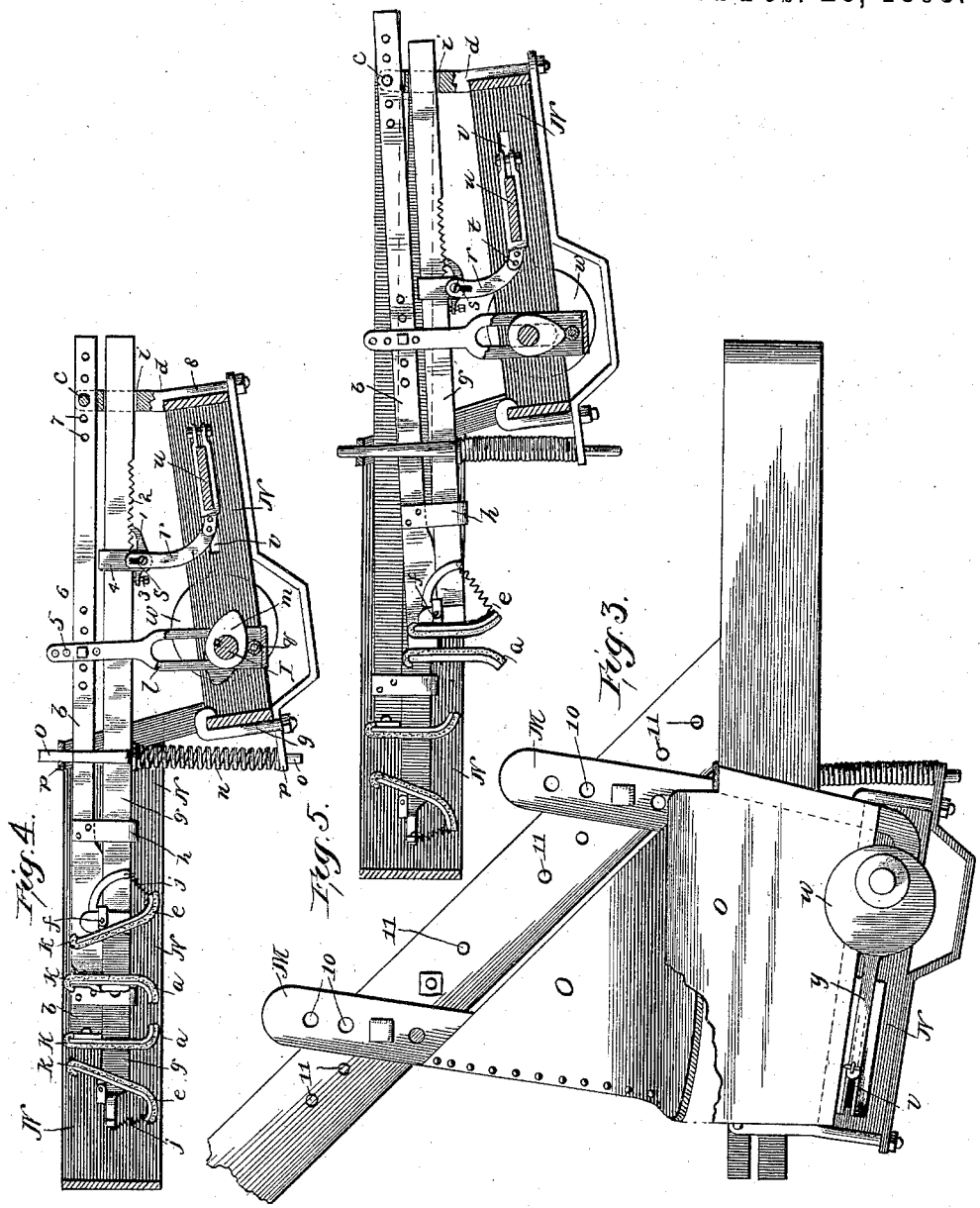

UNITED STATES PATENT OFFICE.

JOHN WESTGARTH, OF LILY LAKE, ILLINOIS.

COW-MILKER.

SPECIFICATION forming part of Letters Patent No. 492,449, dated February 28, 1893.

Application filed December 2, 1890. Serial No. 373,298. (No model.)

*To all whom it may concern:*

Be it known that I, JOHN WESTGARTH, a citizen of the United States, and a resident of the town of Lily Lake, in the county of Kane and State of Illinois, have invented certain new and useful Improvements in Cow-Milkers, of which the following is a specification.

This invention relates to improvements in that class of apparatus, known as cow milkers, designed for milking cows mechanically instead of manually, and has for its prime object, to imitate and simulate the action of the hand upon the teats, in the milking operation.

Another object is to have the apparatus adjustable, not only to animals varying materially in height and size, but also to the differences in the size and location of the teats on the udder, whereby the apparatus is adapted for milking any cow.

These objects are attained by the devices illustrated in the accompanying drawings, in which;

Figure 1 represents a side elevation of a cow milker embodying my invention, illustrating the use of the apparatus, Fig. 2 an enlarged top plan view thereof, Fig. 3 a side elevation of the same, taken from the opposite side to that shown in Fig. 1. Fig. 4 a longitudinal vertical section on the line 4, 4, Fig. 2, looking in the direction indicated by the arrows. Fig. 5 a similar view to Fig. 4, showing the moved position of the parts; and, Fig. 6 a front elevation of the milker, omitting the details of construction, and more clearly showing the breast-bar.

Similar letters and figures of reference indicate the same parts in the several figures of the drawings.

The barn or cow shed in which my device is best adapted for use, is usually divided into a series of stalls arranged in rows, in the forward end of each of which, is a pair of stanchions A, extending between a pair of longitudinal bars B, C, one of which stanchions is fixed and the other pivoted and adjustable so that the cow's head may be inserted between the stanchions, and the movable stanchion then adjusted against the neck of the cow, so as to hold her while being milked, as illustrated in Fig. 1 of the drawings.

In practice there will be one milking apparatus for each stall, adjusted to fit the animal, which usually occupies the stall, but all the apparatus preferably gain their motive power from a common source, whenever such an arrangement is practicable. To this end I provide a line shaft D, journaled in suitable brackets, E attached to the upper bar B, and extending parallel therewith, this shaft being driven from any suitable source of power. Upon this shaft at suitable intervals, is mounted a series of sprocket wheels F, connected by sprocket chains G, with another sprocket wheel H, mounted upon the power shaft I, of each milking apparatus. This power shaft and the other operative parts of the milking device proper, are supported and journaled in a suitable frame, such as the one illustrated in the drawings, comprising an obliquely arranged bar J, hung at its upper end to line shaft D, in any suitable manner, and at its lower end suspended by a chain or cable K, in which is contained a coil spring L, for affording a yielding support for the frame at this end, and to hold the milking apparatus up snugly against the cow. From near the lower end of this bar, depends a pair of vertical hangers M, to the lower ends of which, is secured a rectangular and laterally extending frame N, which is the direct and immediate support of the milking apparatus proper, which latter is suitably covered by a shield O, to prevent contact between the moving parts of the apparatus and the cow, that portion of the shield covering the milking jaws, referred to farther on, being perforated to permit the insertion of the teats in the jaws.

The milking jaws P and P', are four in number, arranged to engage the respective teats, and each jaw comprising a fixed and a movable jaw, both of which have a simultaneous and unitary vertical movement, while the movable jaw has in addition thereto, but simultaneously therewith, a horizontal or pivotal movement, the two forward milking jaws P, working in unison with each other but alternately with the two rear milking jaws P'. The four milking jaws are identical in construction and operation, with the exception that the movable jaws P, are on the forward side of the fixed jaws of the forward pair P, but on the rear side of the rear pair, P′, an arrangement more of choice than of necessity, which does not materially alter the construction or operation; and therefore in describing these parts in detail, for clearness, only a single milking jaw and its operating device will be referred to. The fixed jaw $a$, is rigidly secured to the rear end of a bar $b$, which is in turn pivotally secured near its forward end $c$, to a post $d$, projecting upwardly from the frame N. The movable jaw $e$, is pivotally secured at $f$, at a point above its center of height, to the rear end of the bar $g$, which lies beneath and parallel with the bar $b$, and works through a stirrup guide $h$, depending from near the forward end of the bar $b$, and a guide slot $i$, in the post $d$, as clearly illustrated in Figs. 4 and 5 of the drawings. When the bars are elevated and in their normal position, illustrated in Fig. 4, and the teat is not between the jaws the fixed jaw stands in a vertical plane while the movable jaw stands at an oblique angle thereto, with its upper edge nearer the fixed jaw, being swung upon its pivot and held normally and yieldingly in this inclined or tilted position, by means of a coil spring $j$, secured at its ends respectively to the lower edge of the jaw and an extension of the bar $g$, or by any other equivalent means. Both jaws, are faced with rubber, leather or cloth $k$, or some similar yielding material, to prevent injury to the teats, when squeezed sufficiently.

As before described, the fixed and the movable jaws have a unitary and simultaneous vertical movement, while the movable jaw, in addition thereto, has a simultaneous, horizontal movement or swing upon its pivot. The first movement is accomplished by means of a stirrup $l$, pivotally secured to, and depending from, the bar $b$, about the center of length thereof, in which works a cam $m$, mounted upon the power shaft I, the cam by bearing upon the stirrup, serving to depress the bar $b$, carrying with it the bar $g$, and consequently the two jaws, against the tension of an expansible spring, $n$, which latter serves to elevate and return the bars when relieved of the depressing influence of the cam, this spring being sleeved upon rod $o$, secured to the bar $b$, and working through the guides $p$, upon the frame N, between one of which guides and a shoulder on the rod, the spring is confined. To avoid friction, the stirrup may carry a roller $q$, against which the cam works. The other and independent, but simultaneous movement of the movable jaw $e$, is obtained by means of a link $r$, having a pin and slot connection $s$, at one end, with the bar $g$, and a pivot connection at its opposite end, with a reciprocating bar $u$, working in slotted bearings $v$, upon the frame N, and operated preferably, by the eccentrics $w$, connected with each end thereof by an eccentric rod $y$; but obviously crank arms may be substituted for these eccentrics and eccentric rods, and accomplish the same results.

In operation, the upper edges of the jaws first seize the teat near its juncture with the udder, so as to prevent the running back of the milk therein, and then the two jaws begin to descend or draw downward, gradually closing during their descent, until they reach the limit of their downward stroke, the upper edge of the movable jaw serving as the fulcrum for the jaw during this action, while the pivot thereof, is the point at which the power is applied. The jaws open just as gradually while returning, that is they spread at the bottom first, and arrive at the original height just before parting at the top and releasing the teat. The purpose of this action is to pinch the teat at the highest point first, so as to prevent the milk returning into the udder, while pressing it out, by the action of the jaws, which progresses on the teat toward the point, and then reverses, so as not to release the teat at a time when it might spring upward and get out of the jaws, for it will be understood, that this operation must be repeated many times, just the same as in milking by hand, and that although the teat is released by the jaws to permit a fresh flow of milk therein, it is not intended that the teat shall get out from between the jaws, until the entire milking operation is completed.

While I have shown and described the milking jaws as working in pairs, the two forward ones alternating with the two rear ones, obviously this arrangement may be altered at will, so that the two on one side will alternate with the two on the opposite side, or a rear one on one side may operate with the forward one on the opposite side, or in any other manner suitable to the operator.

To adapt my apparatus for use upon any cow, regardless of its size or shape, or the arrangement or size of its teats, various adjustments are provided, all of which are extremely simple and may be readily and quickly effected by the merest novice. For instance, to cause the movable jaw to approach closer to the fixed jaw, or vice versa, to work upon teats varying in size, I provide the adjustable lock device more clearly shown in Figs. 4 and 5, for changing the point of attachment of the link $r$ to the bar $g$, consisting of a pivoted dog 1, arranged to engage teeth or notches 2, in the lower edge of the bar, in which it is locked by means of a set screw 3, working through the dog at the opposite of its pivot and bearing against the under side of the bar. The same result however may be accomplished in numerous ways, obvious to one skilled in the art, as by providing a series of perforations in the bar, and a pin working through the cleat 4, and one of said perforations.

For adjusting the downward stroke or pull of the jaws, the stirrup $l$, may have a series of perforations 5, therein, by means of which the initial position of the jaws may be adjusted. Should the teats differ in their longitudinal separation or distance apart, the series of perforations in the bar $b$, serves as a ready means for attaining the desired adjustment, while if the teats differ in their lateral separation, the hooks 8 and 9 securing the bars b and g, to the supporting frame N, may be readily adjusted thereon so as to give greater separation to the jaws, the actuating cam, to this end being splined upon the power shaft and therefore adjustable with the other parts. Again, should the animals differ in height, the series of perforations 10, in the hangers M, permits of a vertical adjustment of the entire apparatus independent of the vertical adjustment afforded by the spring support K, L, while a difference in the length of the animals may be compensated for by the series of perforations 11 in the oblique supporting bar J, as will be obvious by an inspection of the drawings. It will therefore be seen, that my apparatus is capable of adjustment to all animals no matter how much they may vary in their essential characteristics, as to size, shape &c.; and that no matter what may be the adjustment, the milking operation performed thereby will simulate the action of the hands upon the teats and perform the milking operation as successfully as if done by hand.

In large barns where a number of these apparatus are employed, gaining their power from a common source, and a number of them to be operated successively by a single operator, suitable clutch devices may be employed, by which the individual apparatus may be thrown into and out of operation; and very little practice will enable the operator to determine what length of time the apparatus should be used, or how many strokes are necessary, to effect the milking of the different cows. In many animals also, the stomach and udder occupy materially different planes, and while in some the milking apparatus would come in proper position if the shield bears against the stomach, in others it might reach too high up while in still others it would not reach the teats without being inclined, to which end I have provided a breast bar 12, adjustably secured to posts 13, upon the frame N, and designed to bear against the breast bone of the animal and thus serve as an effectual and permanent limit to the movement of the apparatus, giving it a fixed relation to the animal at all times regardless of the stomach of the animal, for it will be understood that the stomach of the same animal varies in size and degree of distention to such an extent that a device of this kind is frequently necessary.

The frame N, has a pivot connection 14, (see Fig. 6) with the hangers M, so that when the milking operation is completed the apparatus may be swung down out of the way, but while in use is held in position by a rod 15, secured respectively to the frame and the oblique bar J, the gravity of the apparatus serving to swing it down when this bar is unhooked.

Having described my invention, what I claim, and desire to secure by Letters Patent, is—

1. In a cow milking apparatus, the combination with the milking jaws, comprising a relatively fixed and movable jaw, of means for causing said jaws to have a joint and simultaneous vertical movement, and for causing said movable jaw to have an independent but simultaneous horizontal movement, substantially as and for the purpose described.

2. In a cow milking apparatus, the combination with the milking jaws, comprising a relatively fixed and pivoted jaw, of means for causing said jaws to have a joint and simultaneous vertical movement, and for causing said pivoted jaw to have an independent but simultaneous horizontal movement substantially as described.

3. In a cow milking apparatus, the combination with the milking jaws, comprising a fixed jaw, a movable jaw, pivoted above its center of height, and a spring for swinging said movable jaw on its pivot, so as to cause the upper edge thereof to normally stand nearer the fixed jaw, of means for causing said jaws to have a joint and simultaneous vertical movement, and for causing said movable jaw to have an independent but simultaneous horizontal movement, substantially as described.

4. In a cow milking apparatus, the combination with a milking jaw, comprising a fixed and a movable jaw, of means for imparting to said jaws a joint and simultaneous vertical movement, and for imparting to said movable jaw an independent simultaneous horizontal movement, and means for adjusting said fixed and movable jaws relative to each other, substantially as described.

5. In a cow milking apparatus, the combination with a supporting frame, milking jaws laterally and longitudinally adjustable therein, and means for operating said jaws, of an adjustable or yielding support for said frame, and means for adjusting said frame horizontally and vertically upon said support, subtantially as described.

6. In a cow milking apparatus, the combination with a pivoted bar, a jaw fixedly secured thereto, a sliding bar carried by the first mentioned bar, and a jaw pivotally secured thereto opposing the first mentioned jaw, of means for imparting to said bars a joint and simultaneous vertical movement, and to the sliding bar an independent but simultaneous horizontal movement, substantially as described.

7. In a cow milking apparatus, the combination with a pivoted bar, a jaw fixedly secured thereto, a sliding bar carried by the pivoted bar, a jaw pivotally secured to said bar opposing the fixed jaw, and a spring for swinging said movable jaw on its pivot, of means for imparting to said bars a joint and simultaneous vertical movement, and to the sliding bar, an independent but simultaneous horizontal movement, substantially as described.

8. In a cow milking apparatus, the combination with an adjustable pivoted bar, a jaw fixedly secured thereto, an adjustable sliding bar carried by said pivoted bar, and a jaw pivotally secured to said sliding bar, opposing the fixed jaw, of means for imparting to said bars a joint and simultaneous vertical movement and to said sliding bar an independent but simultaneous horizontal movement, substantially as described.

9. In a cow milking apparatus, the combination with a longitudinally adjustable, pivoted bar, a jaw rigidly secured thereto, a longitudinally adjustable sliding bar carried by said pivoted bar and a jaw pivotally secured to said sliding bar, opposing the fixed jaw, of laterally adjustable supports for said bars and means for imparting to said bars a joint and simultaneous vertical movement, and to said sliding bar, an independent but simultaneous horizontal movement substantially as described.

10. In a cow milking apparatus, the combination with a pivoted bar, a jaw fixedly secured thereto, a sliding bar carried by the pivoted bar, and a jaw pivotally secured to said sliding bar, opposing the fixed jaw, of a power shaft, a cam thereon, a stirrup depending from the pivoted bar engaging and actuated by said cam, and a connection between said shaft and the sliding bar for operating the same, substantially as described.

11. In a cow milking apparatus, the combination with a pivoted bar, a jaw fixedly secured thereto, a sliding bar carried by the pivoted bar, and a jaw pivotally secured to said sliding bar, opposing the fixed jaw, of a power shaft, a cam thereon, a stirrup depending from the pivoted bar engaging and actuated by said cam, a horizontally reciprocating bar connected with and actuated by said shaft, and a link connecting said reciprocating bar with the slide bar, substantially as described.

12. In a cow milking apparatus, the combination with a pivoted bar, a jaw fixedly secured thereto, a sliding bar carried by the pivoted bar and a jaw pivotally secured to said sliding bar, opposing the fixed jaw, of a power shaft, a cam thereon, a stirrup depending from the pivoted bar engaging and actuated by said cam, a reciprocating bar, an eccentric and rod connection between the ends of said bar and the shaft, and a link connecting said bar with the slide bar, substantially as described.

13. In a cow milking apparatus, the combination with a pivoted bar, a jaw fixedly secured thereto, a sliding bar carried by the pivoted bar, a jaw pivotally secured to said sliding bar, opposing the fixed jaw, and a spring for normally elevating said bars, of a power shaft, a cam thereon, a stirrup depending from the pivoted bar engaging and actuated by said cam to overcome the elevating spring, a reciprocating bar, an eccentric and rod connection between the ends of said bar and shaft and a link pivotally secured at one end to said bar, and having a slotted connection at its opposite end with the slide bar, substantially as described.

14. In a cow milking apparatus, the combination with the milking jaws, means for operating the same, and a supporting frame therefor, of an adjustable or yielding support for said frame, means for adjusting said frame horizontally and vertically upon the support, and a breast bar attached to said frame for limiting the upward movement of said support, substantially as and for the purpose described.

JOHN WESTGARTH.

Witnesses:
W. R. OMOHUNDRO,
JAMES R. SCOTT.